Patented Apr. 28, 1925.

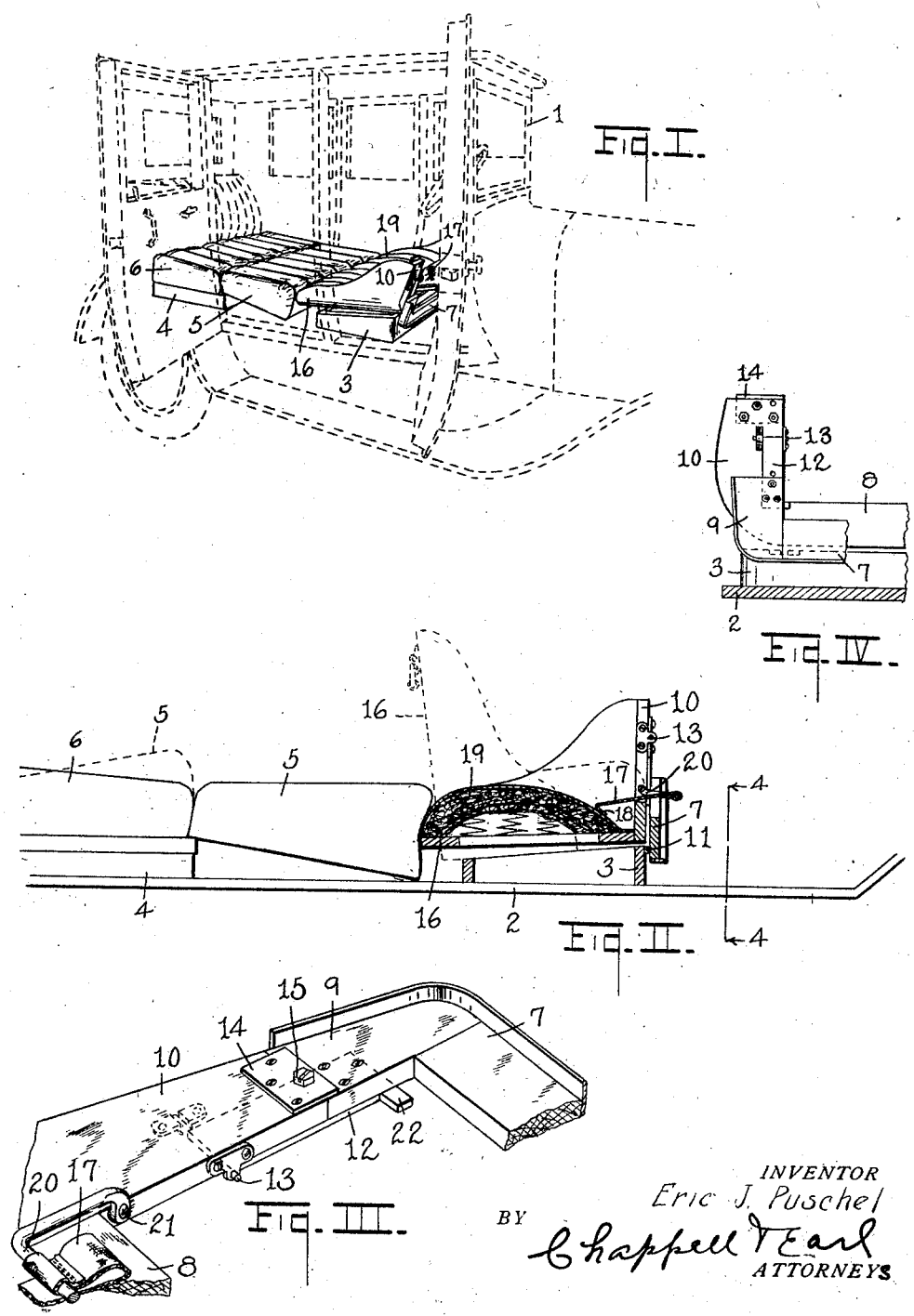

1,535,494

UNITED STATES PATENT OFFICE.

ERIC J. PUSCHEL, OF ALLEGAN, MICHIGAN.

CONVERTIBLE VEHICLE BODY.

Application filed October 13, 1924. Serial No. 743,329.

*To all whom it may concern:*

Be it known that I, ERIC J. PUSCHEL, a citizen of the United States, residing at Allegan, county of Allegan, State of Michigan, have invented certain new and useful Improvements in Convertible Vehicle Bodies, of which the following is a specification.

This invention relates to improvements in convertible vehicle bodies.

The main object of this invention is to provide an improved convertible vehicle body in which the seats may be quickly adjusted to provide a bed.

A further object is to provide a structure embodying these advantages which is very simple and economical.

Objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a perspective view of a vehicle embodying the features of my invention adjusted as a bed, the vehicle being shown by dotted lines.

Fig. II is a fragmentary view partially in vertical section, the parts adjusted to bed position, the position of parts in erected position being indicated by dotted lines.

Fig. III is a fragmentary perspective view of the front seat bottom.

Fig. IV is a fragmentary elevation partially in section on a line corresponding to line 4—4 of Fig. II.

In the drawing similar reference characters refer to similar parts throughout the several views, and the sectional views are taken looking in the direction of the little arrows at the ends of the section lines.

Referring to the drawing, 1 represents a vehicle body of the sedan type and 2 the floor thereof. The front seat base 3 is adapted as a box or receptacle for tools; the rear seat base is conventionally shown at 4.

The rear seat cushion 5 is shown by dotted lines upon the base 4 and by full lines in the position which it occupies when the parts are adjusted as a bed. The front seat cushion 6 is shown in the drawing in the position which it occupies when the parts are adjusted as a bed.

The front seat bottom comprises a front member 7 and a rear member 8, providing a frame-like structure. These frame members 7 and 8 have complementary end sections 9 and 10 respectively of unequal length, the end section 10 being the longer. The front member 7 is hinged to the seat base 3 at 11. The end section 9 has hinged plates 12 bolted thereto to project rearwardly under the section 10 to which it is connected by the pivots 13. These pivots are arranged in a substantially spaced relation from the abutting ends of the end sections so that the front bottom member may be swung on the hinge 11 to upright position as shown in Fig. II, the rear bottom member lying in upright position at the rear of the front bottom member. The parts are held in their erected position so that the bottom swings on the hinge 11 as a unit by means of the locking plates 14 which are rigidly secured to the section 10 to overlap the section 9, screws 15 being arranged through these locking plates and engaging the plates 12, the parts being thus rigidly connected together, so that the seat bottom may be swung forwardly to open the receptacle or box formed by the base 3, thereby permitting its use as a tool box.

The back 16 is carried by the rear member 8 so that when the bottom members are locked in extended or erected position the back is held in its upright position. When, however, the bolts 15 are removed, the seat bottom may be collapsed, permitting the back to swing to the horizontal position, shown in Fig. II.

The front seat cushion 6 is removable and when the structure is adjusted as a bed, the rear seat cushion 5 is moved forwardly so that its rear edge is supported by the rear seat base, the front cushion 6 is disposed at the rear of the cushion 5 and the front seat back collapses as shown.

I preferably provide a flexible extension 17 which is secured at its rear edge 18 to the front seat back cushion 19, its front edge being mounted on the bail-like support 20 which is pivoted at 21 to the rear bottom section 10 so as to be swung rearwardly upon the rear bottom section as shown in Fig. III, or extended as shown in Fig. II in which position it rests upon the stop 22 projecting from the hinge plates 12.

With this arrangement of parts, I provide a structure that can be very quickly adjusted as a bed, or erected to provide seats, this convertible feature adding very little to the cost of the vehicle.

I have illustrated and described my improvements as I have embodied the same. I have not attempted to illustrate or describe other embodiments or adaptations as I believe the disclosure made will enable those skilled in the art to embody or adapt my improvements as may be desired.

Having thus described my invention, what I claim as new and desire to secure by Letters Patent is:

1. In a structure of the class described comprising a seat base adapted as a receptacle, a frame-like seat bottom hinged to the front of said base to be swung forwardly to open the receptacle, said seat bottom comprising front and rear members having complementary end sections of an unequal length, those of the rear member being the longer, hinge plates rigidly secured to the under sides of the front member end sections and pivotally connected to the under side of the rear member end sections, the pivots being substantially spaced from the meeting ends of said sections so that the front bottom member may be swung on said bottom hinge and the rear bottom member swung on said hinge connection between said members, locking plates secured to the upper sides of the rear member end sections to overlap the front member end sections when the members are extended, means for securing said locking plates to said hinge plates whereby the bottom members are locked in extended relation, a back carried by the rear bottom member and provided with a cushion, a removable seat cushion, a flexible extension secured at one edge to said back cushion, a bail-like support for said extension pivotally mounted on the rear bottom member to collapse rearwardly thereon below said back cushion or to be swung forwardly between said end sections for supporting said extension in erected position, and rests for said support when in erected position.

2. In a structure of the class described comprising a seat base adapted as a receptacle, a frame-like seat bottom hinged to the front of said base to be swung forwardly to open the receptacle, said seat bottom comprising front and rear members having complementary end sections of an unequal length, those of the rear member being the longer, hinge plates rigidly secured to the under sides of the front member end sections and pivotally connected to the under side of the rear member end sections, the pivots being substantially spaced from the meeting ends of said sections so that the front bottom member may be swung on said bottom hinge and the rear bottom member swung on said hinge connection between said members, locking plates secured to the upper sides of the rear member end sections to overlap the front member end sections when the members are extended, means for securing said locking plates to said hinge plates whereby the bottom members are locked in extended relation, a back carried by the rear bottom member and provided with a cushion, a removable seat cushion, a flexible extension secured at one edge to said back cushion, and a bail-like support for said extension pivotally mounted on the rear bottom member to collapse rearwardly thereon below said back cushion or to be swung forwardly between said end sections for supporting said extension in erected position.

3. In a structure of the class described comprising a seat base adapted as a receptacle, a frame-like seat bottom hinged to the front of said base to be swung forwardly to open the receptacle, said seat bottom comprising front and rear members having complementary end sections of an unequal length, those of the rear member being the longer, hinge plates rigidly secured to the under sides of the front member end sections and pivotally connected to the under side of the rear member end sections, the pivots being substantially spaced from the meeting ends of said sections so that the front bottom member may be swung on said bottom hinge and the rear bottom member swung on said hinge connection between said members, locking plates secured to the upper sides of the rear member end sections to overlap the front member end sections when the members are extended, means for securing said locking plates to said hinge plates whereby the bottom members are locked in extended relation, a back carried by the rear bottom member and provided with a cushion, and a removable seat cushion.

4. In a structure of the class described comprising a frame-like seat bottom comprising front and rear members having complementary end sections of an unequal length, those of the rear member being the longer, hinge plates rigidly secured to the under sides of the front member end sections and pivotally connected to the under side of the rear member end sections, the pivots being substantially spaced from the meeting ends of said sections so that the front bottom member may be swung on said hinge connection between said members, said front member being hinged at its forward edge, means for securing said bottom members in extended relation, a back carried by the rear bottom member, a removable seat cushion, a flexible extension secured at one edge to said back cushion, and a support for said extension pivotally mounted on the rear bottom member to collapse rearwardly thereon or to be swung forwardly between said end sections for supporting said extension in extended position.

5. In a structure of the class described comprising a frame-like seat bottom comprising front and rear members having complementary end sections of an unequal length, those of the rear member being the longer, hinge plates rigidly secured to the under sides of the front member end sections and pivotally connected to the under side of the rear member end sections, the pivots being substantially spaced from the meeting ends of said sections so that the front bottom member may be swung on said hinge connection between said members, said front member being hinged at its forward edge, means for securing said bottom members in extended relation, a back carried by the rear bottom member, and a removable seat cushion.

6. In a structure of the class described comprising a seat base adapted as a receptacle, a seat bottom hinged to the front of said base to be swung forwardly to open the receptacle, said seat bottom comprising front and rear members, a hinge connection between said bottom members, means for securing said bottom members in erected relation, a back carried by the rear bottom member, and a removable seat cushion.

7. In a structure of the class described comprising a seat base, a seat bottom hinged to the front of said base to be swung forwardly, said seat bottom comprising front and rear members, a hinge connection between said bottom members, means for securing said bottom members in erected relation, a back carried by the rear bottom member, and a removable seat cushion.

8. In a structure of the class described comprising a seat base, a seat bottom hinged to the front of said base to be swung forwardly, said seat bottom comprising front and rear members, a hinge connection between said bottom members, means for securing said bottom members in erected relation, a back carried by the rear bottom member, a removable seat cushion, a flexible extension secured at one edge to said back cushion, and a support for said extension pivotally mounted on the rear bottom member to collapse rearwardly thereon or to be swung forwardly between said end sections for supporting said extension in extended position.

9. In a structure of the class described comprising a seat bottom comprising front and rear members, the rear member being hinged to the front member, means for securing said members in erected position, and a back carried by said rear seat member whereby the seat members may be folded together to permit the back being swung to a horizontal position or secured in erected position to support the back in upright position.

In witness whereof I have hereunto set my hand.

ERIC J. PUSCHEL.